E. DOR-DELATTRE.
PROCESS FOR OBTAINING INTIMATE MIXTURES.
APPLICATION FILED NOV. 15, 1907.

939,989.

Patented Nov. 16, 1909.

2 SHEETS—SHEET 1.

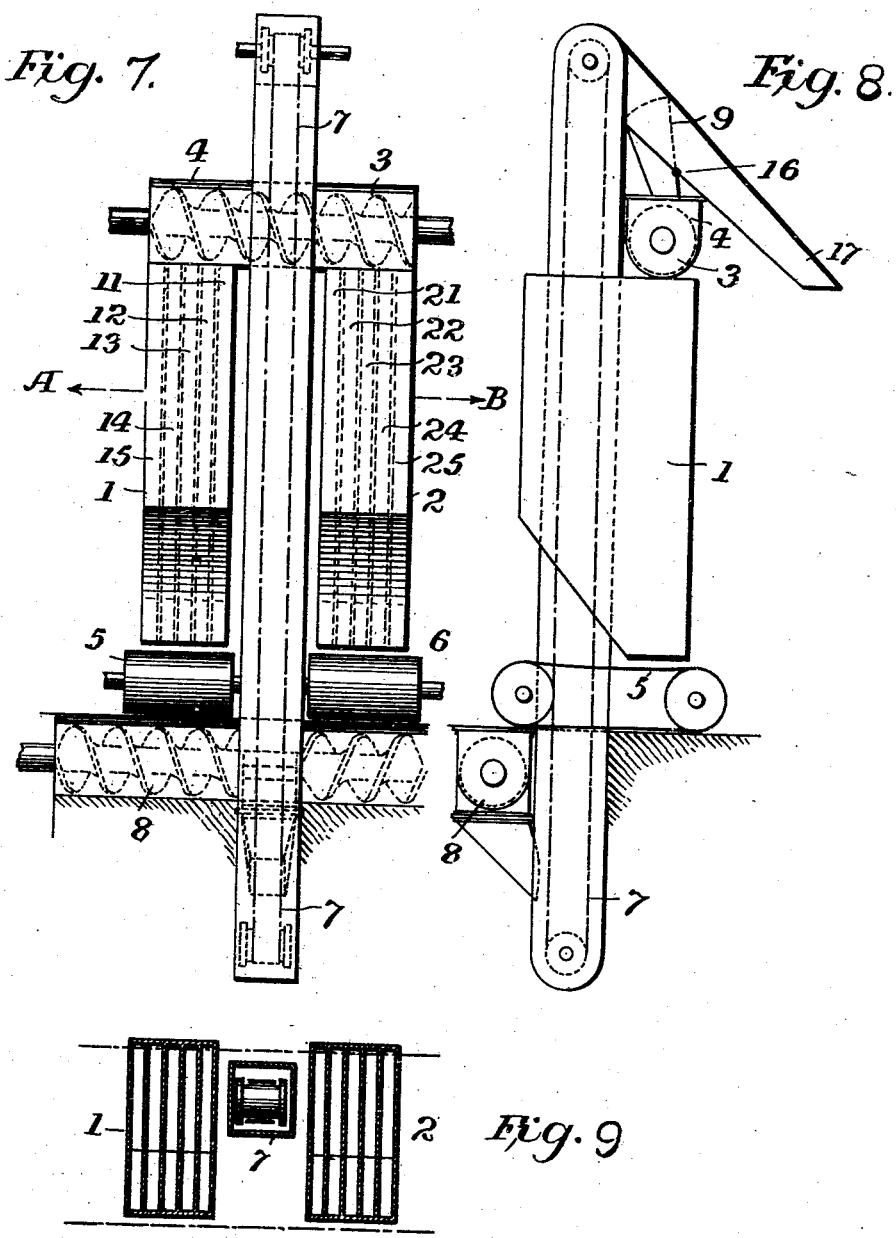

UNITED STATES PATENT OFFICE.

EMILE DOR-DELATTRE, OF LIEGE, BELGIUM.

PROCESS FOR OBTAINING INTIMATE MIXTURES.

939,989.  Specification of Letters Patent.  Patented Nov. 16, 1909.

Application filed November 15, 1907. Serial No. 402,361.

*To all whom it may concern:*

Be it known that I, EMILE DOR-DELATTRE, a resident of Liege, Belgium, a subject of the King of the Belgians, engineer, have invented certain new and useful Improvements in Processes for Obtaining Intimate Mixtures, of which the following is a full, clear, and exact description, such as will enable others skilled in the art to which it appertains to make and use the same.

The present invention relates to a process of mixing granular substances and has for its object to provide a method or process by which the use of apparatus known as "dosers" will be avoided. Such apparatus requires a special and very accurate adjustment whenever a substantially different character of mixture is to be obtained and the proper regulation or control and adjustment of such apparatus requires considerable skill. Also in using "dosers" it is necessary to have a special apparatus for each of the substances to be included in the mixture and therefore it is not practicable to employ such an apparatus when a number of substances are to be mixed.

By the process forming the subject of the present invention it is possible not only to obtain a very intimate mixture of any number of different substances, but also avoid the necessity of making any alteration or varying the operation of any part when the character of substances or material to be treated is varied.

While the process herein described is adapted to be employed in various arts and for mixing various substances, it has been employed in mixing zinc ore with carbon preliminary to reducing such ore. From the description of the process hereinafter presented it will be evident, however, that its use is not limited to any one art or any particular substance or substances, but it may be employed wherever it is desired to obtain an intimate mixture of any substances adapted to be handled in the manner described.

In the accompanying drawings: Figures 1 to 6 are diagrammatic views; Fig. 7 is a front view of an apparatus adapted to carry out the improved process; Fig. 8 is a side view of the apparatus; and Fig. 9 is a horizontal sectional view on the line A—B of Fig. 7.

Referring particularly to the diagrammatic views it will be seen that, briefly stated, the process consists in—1, introducing the substances to be mixed into a receptacle which is divided into a plurality of vertical compartments: 2, transferring the lower layer or portion of the contents of each of said vertical compartments to the compartments of a second similar receptacle, in succession: 3, transferring the lower layer or portion of the contents of each of the compartments of the second receptacle to the compartments of the first receptacle in succession and 4, repeating such transferring operation as often as may be necessary to obtain the desired mixture. It can be readily demonstrated that by such successive mixing there may be obtained a perfect mixture. That is, a mixture so intimate that any portion thereof will contain the desired proportion of each of the substances or ingredients constituting the mixture.

Referring to Figs. 1, 2 and 3, for purposes of illustration, in which are represented two receptacles, designated 1, 2, respectively, each divided into five vertical compartments, and assuming that four different substances designated $a$, $b$, $c$ and $d$ are to be mixed, it will be seen that such substances are introduced into the compartments of the receptacle 1 successively. The substances may be considered as forming ten horizontal layers each including a portion of the substances in each vertical compartment and said horizontal layers being indicated by transverse lines on the drawing. As shown, the several horizontal layers will be of four different classes or characters represented by the reference letters A, B, C and D and each of said layers will have a proportion of each of the substances to be mixed and may be graphically represented as follows:

$$A = \frac{2a + 2b + c}{5}$$

$$B = \frac{2a + b + 2c}{5}$$

$$C = \frac{a + 2b + c + d}{5}$$

$$D = \frac{a + 2b + c + d}{5}$$

In carrying out the process the horizontal layers contained in the receptacle 1 will be successively withdrawn therefrom and conveyed to the vertical compartments of the receptacle 2 which corresponds as regards size and relation of its several compartments to the receptacle 1, the several layers being thereby grouped or arranged as indicated in Fig. 2. By these two mixings each of the horizontal layers within the receptacle 2 will be of one or the other of two classes represented by the reference letters $A_1$ $B_1$, the contents of which is represented as follows:

$$A_1 = \frac{A+B+C+2D}{5}$$

$$B_1 = \frac{A+C+3D}{5}$$

The partially mixed materials are then withdrawn from the receptacle 2 and transferred to the receptacle 1 in the manner previously described, thereby obtaining a further mixing as represented in Fig. 3. At every repetition of the step of withdrawing substances from one receptacle and transferring the same to another, the several substances become more intimately mixed and by repeating such operation a proper number of times it is possible to obtain a practically "perfect" mixture.

As represented in Figs. 4, 5 and 6 the several substances may be more intimately mixed by varying the order in which they are supplied to the first receptacle 1 so as to obtain in said receptacle for example, ten horizontal layers each different from all of the others instead of but four different layers as represented in Fig. 1.

Of course the receptacles employed may be of any desired size and divided into any suitable number of compartments, the size and division of such receptacles depending upon the character of substances to be mixed.

The process is adapted to be carried out by various forms of apparatus the one illustrated being that forming the subject of Patent No. 922,863, the application for which was filed of even date herewith, and it will be seen that by it and after a relatively small number of transferring operations a very intimate mixture of any number of ingredients may be obtained.

The apparatus illustrated in Figs. 7, 8 and 9 includes two similar receptacles 1, 2, each interiorly divided into a plurality of vertical compartments open at both ends. Above the receptacles is arranged a horizontal screw conveyer 3 of such length as to extend entirely across both receptacles, said conveyer working within a suitable casing 4, open at its top, and being adapted, by suitable clutch devices not shown, to rotate in either direction. Below each receptacle is arranged a belt conveyer 5, 6, adapted to deliver material received thereon to a screw conveyer 8. The section of the conveyer 8 coöperating with the belt 5 is the reverse of the section thereof below the belt 6 so that material delivered to said screw by either of the belt conveyers will be carried to an elevator 7 arranged between the receptacles 1, 2. The elevator 7 is provided at its upper end with a discharge chute 17 which extends across the top of the casing of the feed screw 3, and a valve 9 mounted to turn about an axis 16 is arranged in said chute. By adjusting this valve the elevator can be caused to discharge either into the casing 4 of the feed screw 3 or through the chute 17. The manner of using the apparatus may be briefly stated as follows: The materials to be mixed are successively delivered to the lower leg of the elevator 7 or to the conveyer 8 and the valve 9 is adjusted into position to extend across the discharge chute. Power being supplied to the elevator and feed screw 3, and the latter rotated to convey material through the casing 4 over the receptacle 1, the compartments 11, 12, 13, 14 and 15 of said receptacle will be successively filled. When the receptacle 1 is completely filled or the desired amount of material deposited therein, the supply of material is cut off; and thereafter the conveyers 5 and 8 are started and the direction of movement of the feeding screw 3 reversed. The conveyer 5 operates to remove the material from the receptacle 1, each of the compartments in said receptacle simultaneously discharging upon the conveyer and thereby the several substances previously contained in said receptacle will be primarily mixed as they are delivered to the screw conveyer 8. By this conveyer and the elevator 7 the partially mixed materials will be discharged into the casing 4 and by the feed screw 3 deposited in the receptacle 2, the compartments 21, 22, 23, 24 and 25 of said receptacle being successively filled. When the belt conveyer 6 is set in motion the materials contained in the receptacle 2 will be withdrawn and if a further mixing is not desired the valve 9 will be adjusted to cause the elevator to discharge through the chute 17. However, if the valve 9 is left in position to cause the elevator to discharge its load on to the feed screw 3, and the direction of movement of said screw is again reversed, the materials which have been mixed by the action of the conveyers 5 and 6 will be returned to the receptacle 1 and again mixed as they are withdrawn from such receptacle by the conveyer 5.

Having thus described the invention what is claimed is:

1. The herein described method or process of mixing granular substances consisting in depositing the material in a plurality of masses, withdrawing portions of each of said masses and forming therefrom another mass separate from those aforesaid, continuing this operation to form a plurality of such secondary masses, treating said secondary masses in a similar manner to form a third set of masses each containing portions of all of said secondary masses and continuing such procedure until the desired mixture is obtained.

2. The herein described method or process of mixing granular substances consisting in depositing the material in a plurality of masses, simultaneously withdrawing material from the bottom of each of said masses and depositing the same successively in a plurality of secondary masses each independent of those aforesaid, and by similar operations forming as many subsequent series of masses as are necessary to produce the desired mixture.

3. The herein described method or process of mixing granular substances consisting in depositing the material in a plurality of masses, withdrawing horizontal layers of material from all of said masses and depositing the same vertically in masses independent of those aforesaid, and similarly treating the second and subsequent series of masses until the desired mixture is obtained.

4. The herein described method or process of mixing granular substances, consisting in depositing the substances to be mixed in a plurality of independent vertical masses, simultaneously withdrawing the lowermost portion of the contents of each of said masses and transferring the same to the first of a plurality of independent masses similar to those aforesaid, continuing this step and forming said secondary masses successively until all of the first said series of masses is thus shifted, and, by similar operations, forming subsequent series of masses until the desired mixture is obtained.

In testimony whereof I have signed my name to this specification in the presence of two subscribing witnesses.

EMILE DOR-DELATTRE.

Witnesses:
A. PICARD,
ED. SEPULCHRE.